United States Patent [19]

Pigford

[11] Patent Number: 4,982,818
[45] Date of Patent: Jan. 8, 1991

[54] CYCLIC BRAKE DISC OVERHAUL TECHNIQUE AND STRUCTURE

[75] Inventor: James F. Pigford, South Bend, Ind.

[73] Assignee: Allied-Signal Inc., Morristown, N.J.

[21] Appl. No.: 422,854

[22] Filed: Oct. 17, 1989

[51] Int. Cl.$^5$ .................... F16D 65/10; B23P 7/00; B23P 17/00; B21D 1/00
[52] U.S. Cl. .................. 188/73.1; 29/402.07; 29/402.19; 29/416; 188/218 XL
[58] Field of Search ........... 188/73.1, 218 XL, 251 A, 188/251 M; 29/402.03–402.07, 402.16, 402.19, 416; 192/107 R, 70.13

[56] References Cited

U.S. PATENT DOCUMENTS

| | | | |
|---|---|---|---|
| 2,884,693 | 5/1959 | Wagner | 29/416 |
| 3,712,427 | 1/1973 | Cook et al. | 188/251 A |
| 3,800,392 | 4/1974 | Cook et al. | 192/107 R X |
| 3,871,934 | 3/1975 | Marin | 156/94 |
| 3,956,548 | 5/1976 | Kovac et al. | 428/64 |
| 4,002,225 | 1/1977 | Marin | 188/73.2 |
| 4,018,311 | 4/1977 | Tickle | 188/218 X L |
| 4,449,624 | 5/1984 | F'Geppert | 192/70.13 |
| 4,742,948 | 5/1988 | Fisher et al. | 188/251 A X |

FOREIGN PATENT DOCUMENTS 219250 2/1985 Fed. Rep. of Germany .
255974 4/1988 Fed. Rep. of Germany .

OTHER PUBLICATIONS

*The Economic and Safety Aspects of Commercial Aircraft Carbon Brakes* by L. FitzGerald and B. Lockwood-Goose of Dunlop Limited, International Federation of Airworthiness Annual Conference, Hyatt Long Beach Hotel Calif., U.S.A.-Apr. 18–21st, 1982.

Primary Examiner—Robert J. Oberleitner
Attorney, Agent, or Firm—Larry J. Palguta; Ken C. Decker

[57] ABSTRACT

The cyclic carbon brake disc overhaul technique comprises the steps of splitting a worn carbon disc (10, 100 ) into two equal disc halvess (16, 116), machining the disc halves (16, 116) to a predetermined axial thickness, and then bonding the disc halves (18, 118) of predetermined thickness to a core member (22, 122). The disc halves (18) may include drive regions (20) at respective ends thereof, or the halves (118) may have the drive regions (112) removed therefrom. The core member (224) may have axially extending drive portions (225) such that the disc halves (118) of reduced radial length define wear grooves (227) with the drive portions (225).

10 Claims, 2 Drawing Sheets

CYCLE
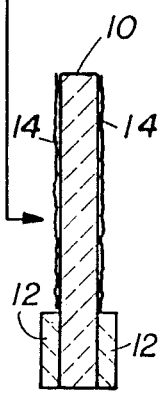 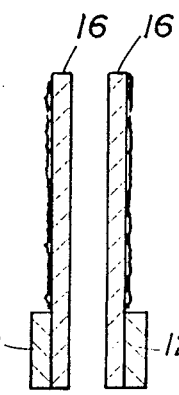 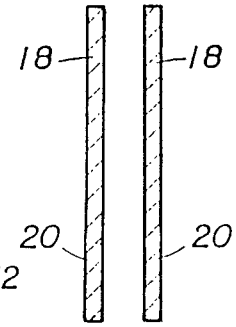 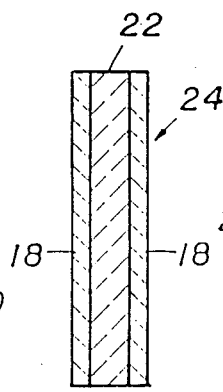 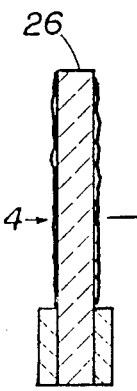
FIG.1　　FIG.2　　FIG.3　　FIG.4　　FIG.5
CYCLE
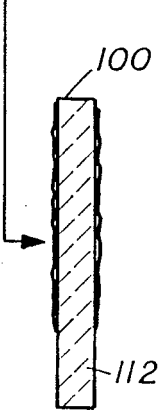 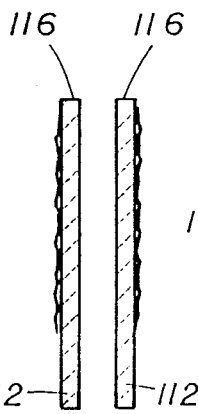 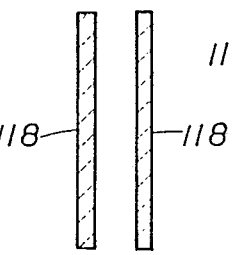 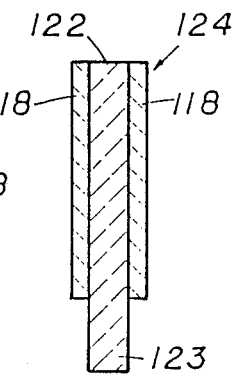 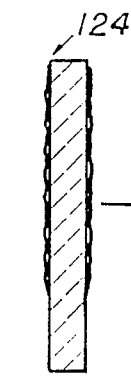
FIG.6　　FIG.7　　FIG.8　　FIG.9　　FIG.10

CYCLIC BRAKE DISC OVERHAUL TECHNIQUE AND STRUCTURE

The present invention relates generally to a cyclic carbon brake disc overhaul technique, and in particular to an overhaul technique utilized for carbon-carbon composite friction discs utilized in aircraft brakes.

Aircraft brake discs may be made from carbon-carbon composite materials in which layers of carbon fiber cloth are bonded in a dense matrix of carbon which may be deposited by various means to build up the composite structure. One method of depositing the carbon matrix is by chemical vapor deposition of carbon from hydro-carbon gases onto a carbon fiber substrate in a vacuum furnace at high temperature. Another method is by charring organic substances such as resins which have been infiltrated into a carbon fiber mass. In either case, the process for manufacture of a brake disc is lengthy and expensive, and it is therefore highly desirable that some means be found for repairing brake discs which may have been worn or damaged in service. U.S. Pat. Nos. 3,712,427, and 3,800,392 describe a method for grinding down a worn disc and then attaching thin "wear plates" of carbon or graphite material to one or both sides of the machined carbon core. U.S. Pat. No. 4,742,948 discloses a method whereby two carbon-carbon composite friction members are fusion-bonded together to provide a carbon-carbon composite friction disc. Additional methods for extending the wear life of carbon brake discs have been proposed. The presentation and article entitled "*The Economic and Safety Aspects of Commercial Carbon Brakes*", Apr. 18-21, 1982 by L. FitzGerald and B. Lockwood-Goose, and U.S. Pat. Nos. 4,613,017 and 4,742,895, both disclose the use of different thickness stators and rotors in a carbon brake assembly and overhaul procedure. It is highly desirable to provide for the refurbishment of worn or damaged carbon discs such that a high percentage of the originally manufactured carbon material is utilized in the refurbishment process and scrap material is kept to a minimum. It is highly desirable that the various parts of a refurbished brake disc be made of the same material so each part will exhibit similar characteristics during the use of the discs. It is also desirable that the amount of new carbon-carbon composite material utilized in the refurbishment process be minimized so that much of the material utilized is previously worn or used carbon material.

The present invention provides a solution to the above objectives by providing a cyclic carbon brake disc overhaul technique wherein a method for manufacture of a carbon-carbon composite friction disc from worn parts comprises:

splitting a worn carbon disc into equal disc halves;

machining each disc half to a predetermined thickness dimension; and bonding the disc halves to each side of a carbon-carbon composite core member.

The invention is described in detail below with reference to the drawings which illustrate several carbon-carbon composite friction disc embodiments in which:

FIG. 1 is a section view of a worn carbon disc shown in FIG. 12;

FIG. 2 is a section view of the worn carbon disc split into equal disc halves;

FIG. 3 is a section view of the equal disc halves after machining;

FIG. 4 illustrates the disc halves bonded to a new core member;

FIG. 5 illustrates the refurbished carbon disc at the end of its service life and prior to further refurbishment;

FIG. 6 illustrates a worn carbon disc;

FIG. 7 illustrates the worn carbon disc split into equal disc halves;

FIG. 8 illustrates the machining of the equal disc halves with the respective drive regions removed therefrom;

FIG. 9 illustrates the equal disc halves bonded to a new a core member;

FIG. 10 illustrates the refurbished carbon disc at the end of its service life and prior to further refurbishment;

Figure 11:
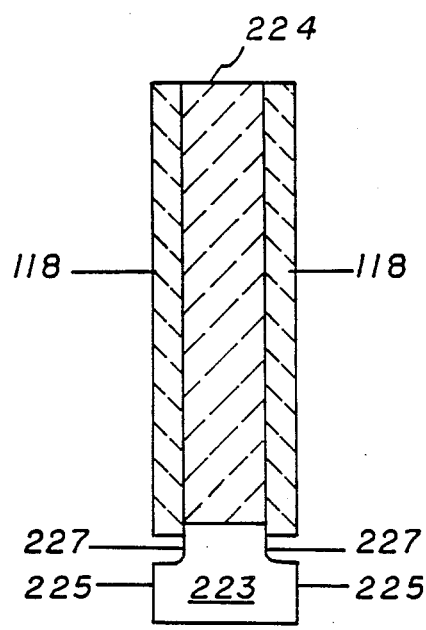
FIG. 11 illustrates a refurbished carbon disc which provides wear grooves between the equal disc halves and drive regions of a new core member.

Carbon brake discs are also referred to as carbon-carbon composite friction discs which may be utilized in the brakes of aircraft. The cyclic carbon brake disc overhaul technique of the present invention utilizes the structural carbon core of a previously worn carbon disc as the disposable or usable wear material for a subsequently refurbished carbon disc. For the cyclic disc overhaul technique, the core will be configured so as to allow splitting of the remaining core material and the fabrication of two disc halves or wear rings. These wear rings or disc halves will be utilized as the wearable friction material in the carbon disc refurbishment technique illustrated schematically in FIGS. 1-11. FIGS. 1-11 each illustrate schematically in section view a representative half of an annular disc which has a central opening through which extends an axle. An isometric view of a worn carbon disc 10 is illustrated in FIG. 12.

Referring to FIG. 1, a worn carbon disc 10 includes axial drive regions 12 which extend axially outwardly from the worn or rough faces 14. In FIG. 2, the disc 10 is split or cut into two substantially equal disc halves 16. Disc halves 16 are then machined or sanded to a predetermined axial thickness to provide disc halves 18 illustrated in FIG. 3. Disc halves 18 include axial drive portions 20. The disc halves 18 of predetermined axial thickness are then bonded to a new core member 22 as illustrated in FIG. 4. New core member 22 comprises a carbon-carbon composite friction disc material which is identical to the carbon-carbon composite friction disc material of disc halves 18. The bonding may be effected by any method suitable for adhering the disc halves 18 to core member 22, one method and composition therefor being disclosed in U.S. Pat. No. 4,742,948. The new core member 22 and disc halves 18 provide a refurbished carbon-carbon composite friction disc 24 which may be utilized within a brake of a vehicle, for example, an aircraft brake. After the refurbished disc 24 has completed its service life, it will appear as illustrated in FIG. 5, which is very similar to the worn disc 10 illustrated in FIG. 1. The core section 26 of disc 24 may then be processed through the carbon brake disc overhaul technique of the present invention, beginning with the step illustrated schematically in FIG. 1, to provide another refurbished carbon-carbon composite friction disc. Thus, the disc overhaul technique of the present invention continually utilizes and recycles the core portion of a worn carbon disc, so that a very large portion of each originally manufactured carbon-carbon composite friction disc is utilized and scrap produced during the refurbishment technique is kept to a minimum.

FIGS. 6–10 illustrate an alternative cyclic carbon brake disc overhaul technique wherein the disc 100 illustrated schematically in FIG. 6 has a reduced axial drive region 112. Axial drive region 112 has an axial dimension approximately equal to the axial dimension of the worn friction portion of disc 100. In accordance with the overhaul technique disclosed above, worn disc 100 is split into equal disc halves 116 each of which has an axial drive region 112. In FIG. 8, the disc halves 116 are each machined or sanded to a final predetermined axial dimension to provide disc halves 118, and both drive regions 112 have been removed therefrom. Thus, disc halves 118 each have a radial dimension which is less than the overall radial dimension of the final refurbished carbon disc. In FIG. 9, the disc halves 118 are bonded to the new central core member 122 which includes a drive region 123 to produce brake disc 124. The refurbished brake disc 124 provides a disc which has a larger axial dimension across the disc halves 118 and central core member 122 than the axial dimension of the axial drive region 123. FIG. 10 illustrates the refurbished brake disc 124 at the end of its service life when it is ready for refurbishment via the cyclic carbon brake disc overhaul technique disclosed above.

Figure 12:
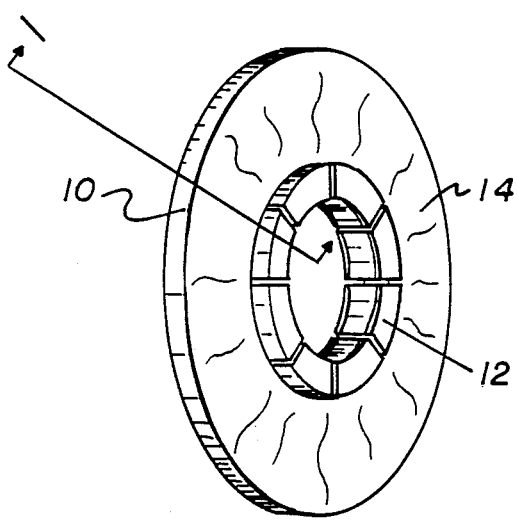
FIG. 12 is an illustration of the worn annular carbon disc shown in FIG. 1.

FIG. 11 illustrates an alternative carbon-carbon composite friction disc which utilizes the disc halves 118 illustrated in FIG. 8 and provided by the refurbishment technique of FIGS. 6–10. The central core member 224 includes an axial drive region 223 which has axially extending drive portions 225 that define, together with the disc halves 118, wear grooves 227 in the refurbished disc 224. The wear grooves are the same as those illustrated in U.S. Pat. No. 4,804,071, but have been provided by the refurbishment technique rather than being machined in the surface of a new carbon-carbon composite friction disc.

The cyclic carbon brake disc overhaul technique of the present invention provides a refurbishment method which utilizes all of the carbon material that is present within the friction surface or rubbing surface as wearable friction material. None of the central core or worn disc structure will be scrapped due to insufficient structural capacity. Each disc core can be reconfigured into a wearable friction material for a subsequent refurbished friction disc. The technique minimizes the amount of raw carbon material needed to overhaul a brake throughout its service life. All carbon material from each friction disc may potentially be utilized as wearable material (a disc half) except for a small percentage of carbon material which is machined or sanded off the disc halves during their fabrication. Also, some material can be removed from the drive regions as illustrated in FIG. 8. The technique ensures that the structural carbon core of all the refurbished discs will have the same capabilities. The structural core of each refurbished disc half is replaced by new material fabricated by the identical process, material, and by the identical manufacture. Thus, the technique ensures that the friction, wear, and thermal performance of all refurbished discs will be identical. The technique permits the utilization of various individual disc thicknesses for use in a tailored brake. Disc thicknesses can be tailored easily by bonding different thickness disc halves to the new central structural core member. And as disclosed in FIG. 11, for brake configurations which require friction surface wear grooves, the technique can be modified to eliminate the drive region of core halves so that when the core halves are utilized with a new central core member having axially extending drive portions, there is eliminated the need for machining wear grooves into the friction surfaces of the disc. Finally, the technique requires no reprocessing of the refurbished discs to recover material strength, friction or wear performance. The friction surface of each refurbished disc is fabricated from a previously used structural disc core made by the identical process, material, and manufacture. The structural core of the refurbished disc will be new and fabricated by the identical process, material, and manufacture.

I claim:

1. A method for manufacturing a carbon-carbon composite friction disc from worn parts comprising:
    radially splitting a worn carbon disc into equal disc halves;
    machining each disc half to a predetermined thickness dimension; and
    bonding the disc halves to each side of a carbon-carbon composite core member.

2. The method in accordance with claim 1, wherein the carbon-carbon composite friction disc comprises a stator disc.

3. The method in accordance with claim 1, wherein the carbon-carbon composite friction disc comprises a rotor disc.

4. The method in accordance with claim 1, wherein each disc half includes a drive region which is reduced in axial length during the machining step.

5. The method in accordance with claim 1, wherein the machining step includes the removal of a drive region from a radial end of each disc half.

6. The method in accordance with claim 5, wherein the core member includes at one end axially extending drive regions thereof so that each side of the friction disc provides a groove between the respective axially extending drive region and radial end of the disc half.

7. A carbon-carbon composite friction disc produced by the method of claim 1, the carbon-carbon composite friction disc comprising at least three carbon-carbon composite structural components to provide a carbon-carbon composite friction disc manufactured from some worn parts, the friction disc including the core member to each side of which is bonded the worn disc halves to provide wear ring portions of the carbon-carbon composite friction disc.

8. The carbon-carbon composite friction disc in accordance with claim 7, wherein the disc halves each include at one radial end thereof a drive region.

9. The carbon-carbon composite friction disc in accordance with claim 7, wherein each of the disc halves includes a radial dimension which is less than a radial dimension of said core member so that each disc half defines with said core member a shoulder extending from a larger axial dimension to a lesser axial dimension of the composite friction disc.

10. The carbon-carbon composite friction disc in accordance with claim 7, wherein each of the disc halves comprises a radial dimension less than the radial dimension of said core member, the core member having axially extending drive regions on each side thereof so that each respective drive region and an end of a disc half define a groove therebetween.

* * * * *